US009677241B2

(12) United States Patent
Lee

(10) Patent No.: US 9,677,241 B2
(45) Date of Patent: Jun. 13, 2017

(54) PASSIVE GROUT SEAL

(71) Applicant: James Lee, Houston, TX (US)

(72) Inventor: James Lee, Houston, TX (US)

(*) Notice: Subject to any disclaimer, the term of this patent is extended or adjusted under 35 U.S.C. 154(b) by 0 days.

(21) Appl. No.: 14/450,285

(22) Filed: Aug. 4, 2014

(65) Prior Publication Data

US 2016/0032550 A1   Feb. 4, 2016

(51) Int. Cl.
*E02D 5/52* (2006.01)
*F16J 15/00* (2006.01)
*E02D 27/52* (2006.01)

(52) U.S. Cl.
CPC ............ *E02D 5/526* (2013.01); *E02D 27/52* (2013.01); *F16J 15/00* (2013.01)

(58) Field of Classification Search
CPC .. E02D 5/62; E02D 5/526; E02D 5/60; E02D 27/525; E02D 27/52; E02D 27/50; F16L 21/02; E02B 17/0008; E02B 2017/0039; E02B 17/02; E02B 17/04; E02B 2017/0073; E02B 3/16; F16J 15/00
See application file for complete search history.

(56) References Cited

U.S. PATENT DOCUMENTS

| | | | | |
|---|---|---|---|---|
| 2,523,182 A | * | 9/1950 | Battaglia | B60C 9/16 152/202 |
| 3,468,132 A | * | 9/1969 | Harris | E02B 17/0008 405/211 |
| 3,702,537 A | * | 11/1972 | Landers | E02B 17/0008 277/646 |
| 4,077,224 A | * | 3/1978 | Coone | E02D 5/62 405/225 |
| 4,171,923 A | * | 10/1979 | Landers | E02B 17/0008 405/225 |
| 4,412,759 A | * | 11/1983 | Britton | E02B 17/0008 405/205 |

FOREIGN PATENT DOCUMENTS

JP     2005-307583     * 11/2005

* cited by examiner

*Primary Examiner* — John Kreck
*Assistant Examiner* — Carib Oquendo
(74) *Attorney, Agent, or Firm* — Tim Liu; Liu Law Group, pllc

(57) ABSTRACT

A passive annular grout seal assembly is disclosed for sealing an annular opening between a driven pile and a skirt pile sleeve for an offshore platform. The annular seals are located at the bottom of the pile sleeves near sea floor and automatically activated when piles are inserted and driven through the pile sleeves without any active operational procedure during offshore piling. The seal configuration fully utilizes the seal height, the grout column height and the density difference between grout and sea water to produce enhanced sealing capacity against the column of grout above.

23 Claims, 4 Drawing Sheets

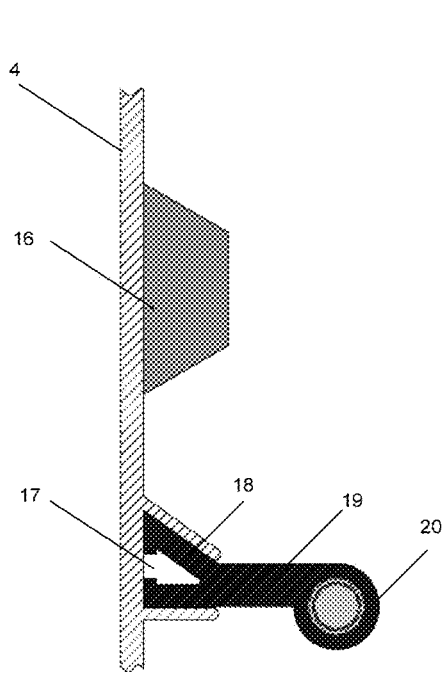
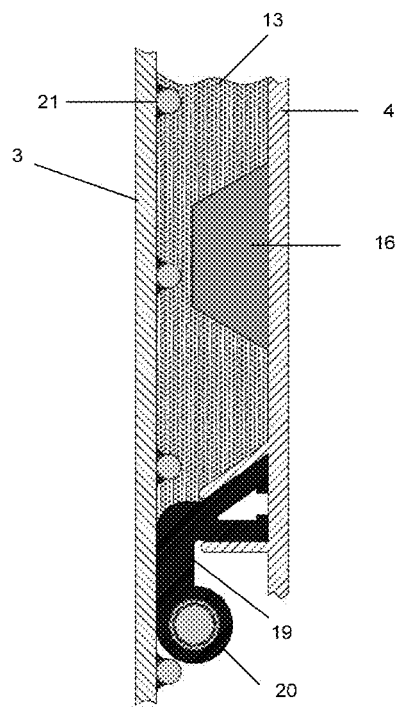
FIG. 4 (Prior Art)        FIG. 5 (Prior Art)
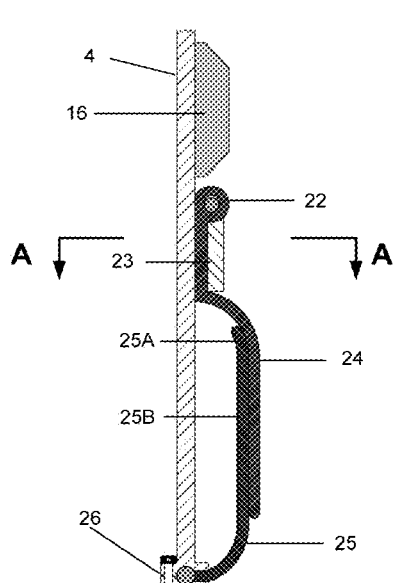
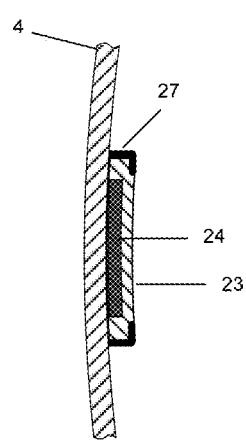
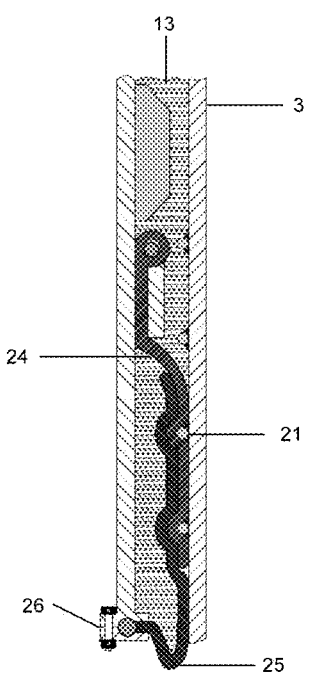
FIG. 6A        FIG. 6B        FIG. 7

PASSIVE GROUT SEAL

FIELD OF THE INVENTION

The disclosure relates generally to an offshore platform employing multiple legs of piling and piling guide sleeve annulus subject to being filled with grout after piles have been driven.

BACKGROUND OF THE INVENTION

In an offshore platform installation, a grout seal is typically utilized to seal the annulus between a pile sleeve inner surface and a pile outer surface and against a high column of concrete during the grout hardening period. FIG. 1 illustrates a deepwater offshore platform with extended legs from water surface to sea floor and a plurality of skirt pile sleeves for housing piles. As shown in FIG. 1, an offshore platform deck 1 is supported by a jacket 2 extended from water surface 6 to sea floor 5. A plurality of pile sleeves 4 are attached to the bottom of the extended legs to house a plurality of piles 3, which are driven into sea floor 5 to provide the anchoring to the platform.

A grout seal is usually located at the bottom of a skirt pile sleeve 4 near sea floor. The seal has to be rugged and highly reliable because any seal failure such as grout leaking could cause the connection failure between a pile sleeve and a pile. Consequently, it could result in the foundation failure of the platform.

Existing Grout Seals for Offshore Structures

In general, there two types of grout seals for pilings in offshore jacket installation: 1) an active grout seal type such as an inflatable packer, and 2) a passive grout seal type such as a CRUX grout seal or a mechanical grout seal.

Inflatable Packer

Inflatable packer was introduced to offshore industry in 1970's and it has been widely utilized in offshore platform fields. Today, inflatable packers still occupy a very large percentage of grout seal market, especially in deepwater platform applications. Inflatable packer is an active assembly which requires a control system above water surface to activate the seal by injecting air or water to form a sealing function. FIG. 2 is an ISO cross section view of a typical inflatable packer used as a grout seal. As an active seal, the seal element is in a retracted position without making contact between the seal outer surface and a pile prior to pile lowering and inserting. As shown in FIG. 2, an inflatable packer element 8 is fixed to the inner wall of a sleeve 4 in a non-inflated condition; an injection tubing 7 is attached at the outer wall of the sleeve 4. To prevent mud at sea floor to pollute grout during pile driving, a mud wiper 9 is usually installed below the packer element 8.

In installing an offshore jacket, common practice utilizing an inflatable packer is to fabricate the jacket on land with jacket leg members and with inflatable packers installed at the bottom of skirt sleeves as grout seals. The jacket is then towed to an installation site for installation. U.S. Pat. No. 3,468,132 to Harris, issued on Sep. 23, 1969, describes a traditional inflatable packer assembly. Until today, this type of active grout seal is still widely used in offshore jacket installation applications.

An inflatable packer is composed of three subsystems in addition to the packer assembly located at the bottom of a pile sleeve: a power subsystem and a high pressure air/water injection subsystem and a piping subsystem. There are two major disadvantages for using an inflatable packer assembly as a grout seal: 1) the assembly is very expensive in terms of yard installation, yard testing and field operation; 2) the assembly is very complicated which could have potential damages in each of the three subsystems during jacket site installation. U.S. Pat. No. 4,279,546 to Harris, issued on Jul. 21, 1981, describes some of these potential damages for an inflatable packer during field operations.

Passive Seals

A typical passive seal is CRUX annular seal, as described in British Pat. No. GB2194006 to Philip et al., issued on Feb. 24, 1988. The seal assembly has an outer head portion attached at the sleeve inner wall and a bulbous ring functioning as a seal element. FIG. 4 illustrates a CRUX annular seal element 19 prior to piling activities. As shown, a guide shim 16 is attached to the inner wall of sleeve 4. An outer head portion 18 is fixed to the sleeve 4 inner wall with an inside cavity 17. A bulbous ring 20 with a fiber core forms the sealing function. The inner diameter of the bulbous ring 20 is less than the outer diameter of a pile so that the deformed ring produces compression force against the pile outer surface to form a sealing function when a pile is driven through the ring. FIG. 5 is a partial cross-section view of a CRUX annular seal when a pile 3 is driven through and a column of grout 13 is poured between the pile 3 and pile sleeve 4. As shown in FIG. 5, the bulbous ring 20 is deformed and the annular seal element 19 is bended against the pile 3 outer surface, which has several levels of shear keys 21, to form a seal for a poured column of grout 13.

A passive seal is significantly less expensive than an inflatable packer. However, the common concerns for this type of seals are the protection and the reliability of the seals during offshore pile installation activities such as pile inserting and pile driving. The pile bottom outer edge could function as a knife to damage the resilient section between the bulbous ring 20 and the outer head portion 18 due to dynamic heave motions of a pile during pile lowering and inserting.

A traditional mechanical grout seal is also a passive seal. A traditional mechanical grout seal is usually only used for shallow water applications because it could not take potential dynamic loading from shear keys which are commonly welded both on the pile top outer surface and on the sleeve inner wall of a deepwater platform for increasing the concrete bonding strength between the sleeve and the pile. A mechanical seal is composed of an annular rubber tubular wall with multiple equally spaced steel bars passing through the rubber tubular wall. These steel bars are bounded and fixed with the rubber tubular wall through a vulcanization process. The bottom of the tubular wall is fixed at the sleeve inner wall and each steel bar top passes through a steel ring which is fixed at the sleeve inner wall. As a result, each steel bar top should be able to slide up and down inside the corresponding steel ring.

FIG. 3 is an ISO cut-off section view of a typical mechanical seal with a driven pile and a column of grout poured in the annulus between a pile and pile sleeve above the seal. As shown in FIG. 3, a mechanical seal element 15, which has an annular inner diameter less than the outer diameter of the pile 3, is attached to the inner wall of the sleeve 4. A plurality of steel bars 11 are through and bonded with the resilient seal element 15 and slides upward through the rings 12 which are fixed at the sleeve 4 inner wall. The seal element 15 forms a seal for the poured column of grout 13 between the pile 3 outer surface and the inner surface of the sleeve 4 during pile 3 grouting. A plurality of tapered guide shims 16 are placed above the seal element 15. The seal element 15 also prevents the mud 14 pollution during pile 3 driving.

OBJECTIVES AND SUMMARY OF THE INVENTION

The principal objective of the disclosure is to provide a passive grout seal that is rugged and resilient, more specifically, to provide a rugged means for anchoring the seal to the sleeve inner wall, to provide a sufficient compression force against the pile outer surface in order to provide a sealing function against a high column of grout above the seal, and to provide a passive grout seal that is resilient during the sealing action for accepting a limited pile offset from the sleeve axial center induced during pile driving.

Another important objective of the disclosure is to provide a protection means for the resilient part of the assembly from physical damages especially during the pile lowering and driving activities.

A still further important objective of the disclosure is to utilize the seal height and the density difference between grout and seawater to produce an increased compression force at pile outer surface along with the seal height and water depth, to further increase the grout sealing capacity.

Another objective of the disclosure is that the introduced grout seal is a passive one without any expensive power system and any associated piping/control subsystems. The seal should be automatically activated when a pile passes through the seal.

A further objective of the disclosure is that the introduced grout seal is able to allow the sleeve to have an upward relative sliding against the pile after a pile is driven, due to the requirement of a potential leveling operation.

A grout seal assembly for sealing an annulus between a pile outer surface and a sleeve inner surface is disclosed. The grout seal assembly is made up with three portions: an upper portion of the assembly is composed of a plurality of spaced hanging strips fixed at the sleeve inner wall surface, the upper portion allows fluid passing into the annulus below; a middle portion of the assembly is composed of a annular tube, made of resilient materials and bonded together with the hanging strips from the upper portion, the middle portion has a cone section on the top of a tubular section; and a bottom portion of the assembly is composed of a tube section extended from the middle section and is fixed to the sleeve inner wall to form a sealed annulus between the sleeve inner surface and the tube outer surface.

BRIEF DESCRIPTION OF THE DRAWINGS

The drawings described herein are for illustrating purposes only of selected embodiments and not all possible implementations, and are not intended to limit the scope of the present disclosure. For further understanding of the nature and objects of this disclosure reference should be made to the following description, taken in conjunction with the accompanying drawings in which like parts are given like reference materials, and wherein:

FIG. 4 is an enlarged partial cross-section view of a CRUX annular seal without a driven pile;

FIG. 5 is an enlarged partial cross-section view of a CRUX annular seal with a driven pile and a column of grout poured between the pile and pile sleeve;

FIG. 6A is an enlarged partial cross-section view of a grout seal disclosed herein with non-welded connections at the top and a flange connection at the sleeve bottom in accordance with one embodiment;

FIG. 6B is an enlarged partial A-A cross-section view of the grout seal shown in FIG. 6A with pre-installed fixings to anchor each strip top to the sleeve inner wall in accordance with one embodiment;

FIG. 7 is an enlarged partial cross-section view of the grout seal shown in FIG. 6A with a driven pile, without pile offsetting to one side, and a column of grout poured in the annulus between the pile and the pile sleeve in accordance with one embodiment;

DETAILED DESCRIPTION OF THE EMBODIMENTS

Figure 1A:
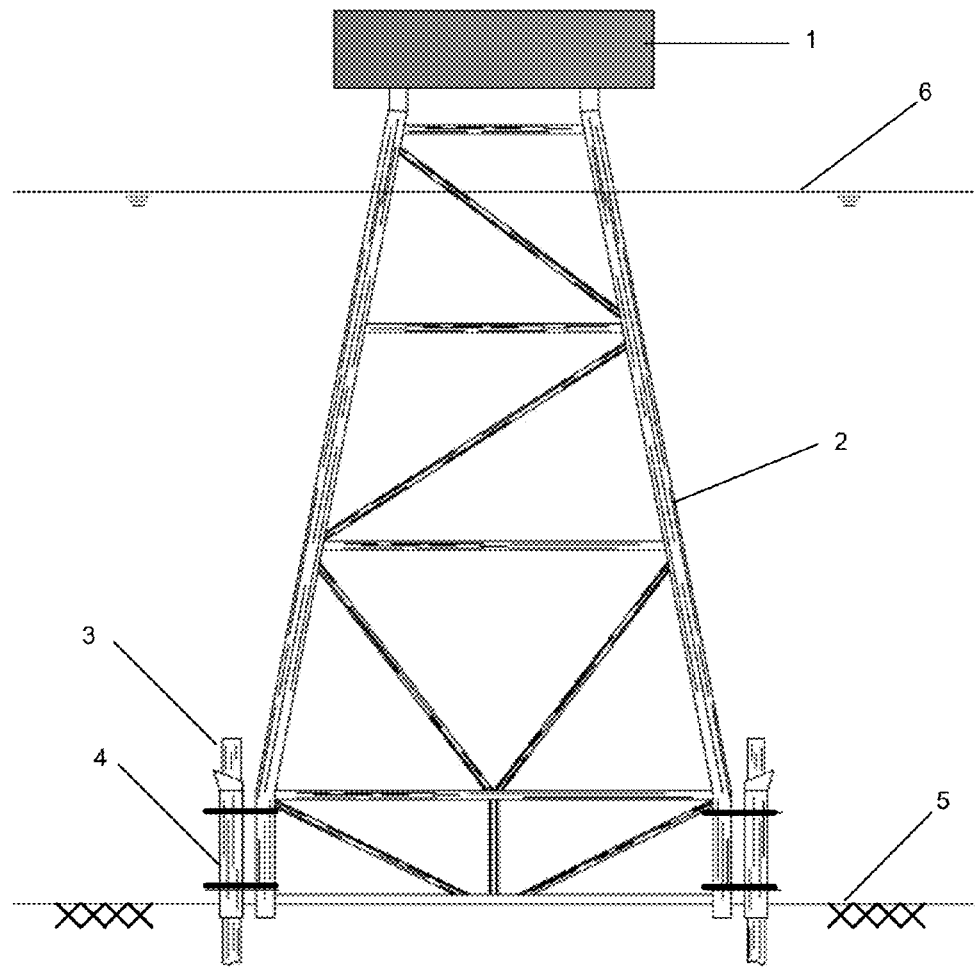
FIG. 1 is an elevation view of a deepwater offshore platform with extended legs from water surface to sea floor and with a plurality of skirt pile sleeves for housing piles.
Figure 2:
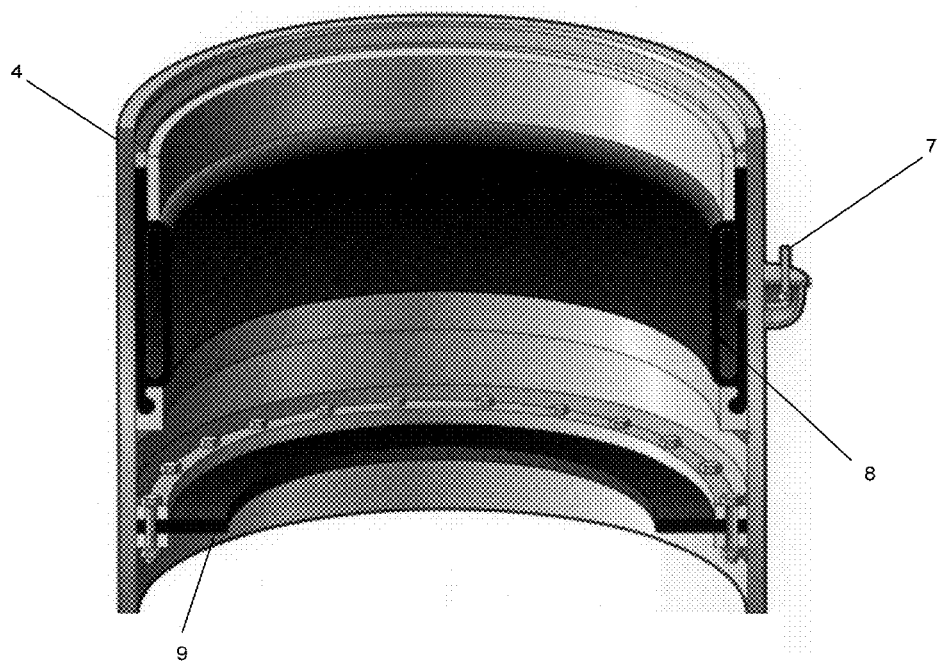
FIG. 2 is an ISO cross section view of a typical inflatable packer used as a grout seal with a mud wiper below.
Figure 3:
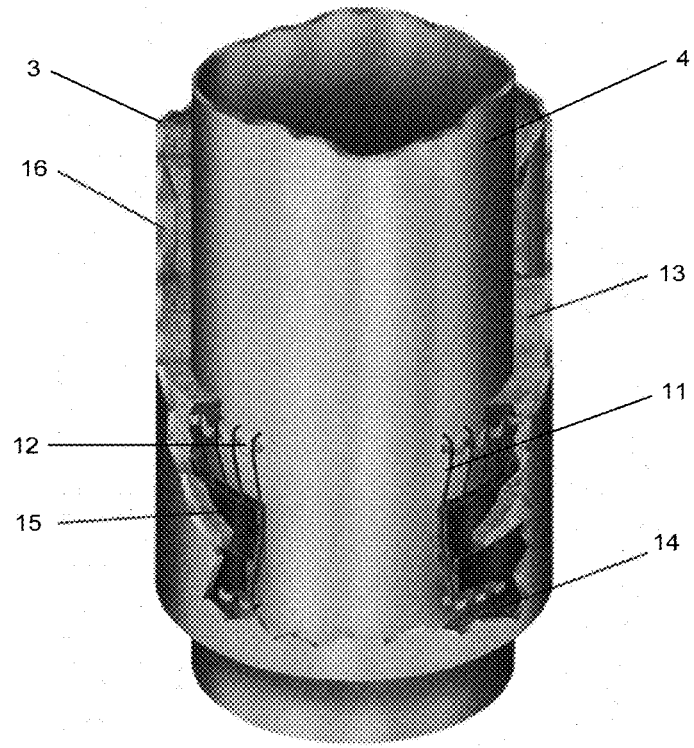
FIG. 3 is an ISO cut-off section view of a typical mechanical seal with a driven pile and a column of grout poured in the annulus between the pile and the pile sleeve above the seal.

Before explaining the disclosed apparatus in detail, it is to be understood that the system and method is not limited to the particular embodiments and that it can be practiced or carried out in various ways.

In accordance with one embodiment of the present disclosure, the main body of the annular grout seal is composed of three different sections: an upper section, a middle section and a bottom section.

The upper section of the seal is composed of 8 to 16 equally spaced resilient strips around the sleeve inner wall. The tops of the strips are fixed to the sleeve inner wall. The bottoms of the strips are bounded with the middle section through a vulcanization process. Each resilient strip is made of several layers of steel nets bounded with elastomer materials through the same vulcanization process. In a preferred embodiment, the strips are strong enough to take the potential vertical dynamic loading induced by pile lowering and inserting actions and to take other potential dynamic forces inside the sleeves such as vortex induced force during a jacket launch and vibration forces during pile driving. These strips are also made to be strong enough against the potential cutting and scraping forces induced by the sharpness of the pile bottom outer edge and pile rough outer surface. Under this configuration, there are many designed holes between each pair of strips to let the grout pass through the top section and fill the vacant room below during grouting operation. One advantage of these hanging rubber strip configuration is easy to accept a pile offset inside the sleeve during pile inserting and pile driving operations.

The middle section of the seal is a resilient tube, with a cone section on top of a tubular section. The top end of the cone section has an inner diameter greater than the corresponding pile outer diameter. The resilient tube is made of several layers of fiber nets bounded with elastomer materials together through the same vulcanization process described above. The inner diameter of the tubular section is less than the diameter of the corresponding pile. In a preferred embodiment, the tubular section has a constant inner diameter and a smooth inner surface, with a height of at least one foot (305 mm) This height requirement is designed to suit the typical one foot vertical spacing of shear keys at pile top outer surface; this will allow the tubular section encounter at least one level of shear keys at the pile top outer surface to further enhance the sealing capacity of the seal assembly. The inner smooth surface of the tubular section helps to reduce the friction force during pile driving operation, while the pile outer surface is sliding through the seal, or while a leveling operation is needed.

The bottom section of the seal is also a resilient tube made of the same material as the middle section. Diameter of the bottom section varies through the height of the section. The top of the bottom section is an extension of the bottom of the middle section. The bottom of the bottom section is fixed at the sleeve inner wall or at the sleeve bottom by a flange, to form a sealed room for a grout column. As the height of the grout column increases inside the annulus, the grout induced horizontal compression force increases accordingly against the pile outer surface through the middle and the bottom tubes.

FIG. 6A illustrates one embodiment of the grout seal. As shown in FIG. 6A, the grout seal has a plurality of bulbous ring section 22 placed below a tapered guide shim 16 which is fixed to the inner wall of the sleeve 4. Each bulbous ring section 22 is connected to the top of a hanging strip 24. In some embodiments, there may be as many as sixteen strips 24 for a grout seal. A tubular section plate 23 is placed just below each bulbous ring section 22. The tubular section plate 23 pushes the strip 24 firmly against the inner wall of the sleeve 4 so that the bulbous ring section 22 may not move downwardly. Both sides of each tubular section plate 23 are extended and fixed at the sleeve 4 inner wall with a pair of pre-installed fixings 27 at the wall surface, as shown in FIG. 6B. One exemplary pre-installed fixing is angles plus bottom plates at these angle bottoms. These fixings 27 provide an anchoring means to sleeve 4 wall for the tubular section plate 23 and for the strip 24. These strips 24 are extended downwardly and placed in front of an annular resilient tube 25. The annular resilient tube 25 has a cone section 25A on top of a tubular section 25B with a constant inner diameter and a smooth inner surface. The bottom of the annular resilient tube 25 has a flange connection 26 at the bottom of sleeve 4 to form a seal for a grout column. The strip 24 and the annular resilient tube 25 are bounded together through a vulcanization process. In a preferred embodiment, the connections of seal top strips 24 to the sleeve inner wall, and the connections at the seal bottom to sleeve inner wall, are designed to be strong enough to allow the grout seal to take relative sliding motion (both upward and downward) between the pile 3 and the pile sleeve 4 during a potential leveling operation.

Referring now to FIG. 7, the grout seal in FIG. 6A is activated with a pile 3 driven and without any pile offset. Grout 13 passes through the holes between strips 24 to fill the annulus room below to form a grout column. Shear keys 21 at the pile 3 outer surface make contact with strips 24 and/or annular resilient tube 25 to enhance the sealing capacity. Shear keys are wrapped by these strips and/or resilient tube. Because the density of grout 13 is greater than that of seawater, the fluid pressure of grout 13 at the column bottom near the flange 26 is much greater than the surrounding seawater pressure at the same water depth. The weight of the grout column forces the resilient tube 25 to be extended downwardly and bended. As a result, the fluid pressure induced by the grout 13 column should provide an increasing horizontal compression force against pile 3 outer surface through the annular resilient tube 25.

The total sealing capacity from the grout seal disclosed herein comes from three areas:

1) The constant diameter of the annular resilient tube 25 should have a tubular section with its diameter smaller than the pile 3 outer diameter. As the pile 3 passing through the seal assembly, the annular resilient tube 25 inner diameter should be enlarged to produce a compression force against the pile 3 outer surface;

2) The wrapped shear keys 21 by these strips 24 and/or the tubular of the annular resilient tube 25 should further enlarge the tubular diameter of the annular resilient tube 25 to produce an increased compression force against the pile 3 outer surface;

3) The high column of grout 13 at the seal bottom should provide an increasing horizontal fluid pressure against pile 3 outer surface through the bottom portion of the annular resilient tube 25 to create an additional sealing force of the invented seal.

Figure 8:
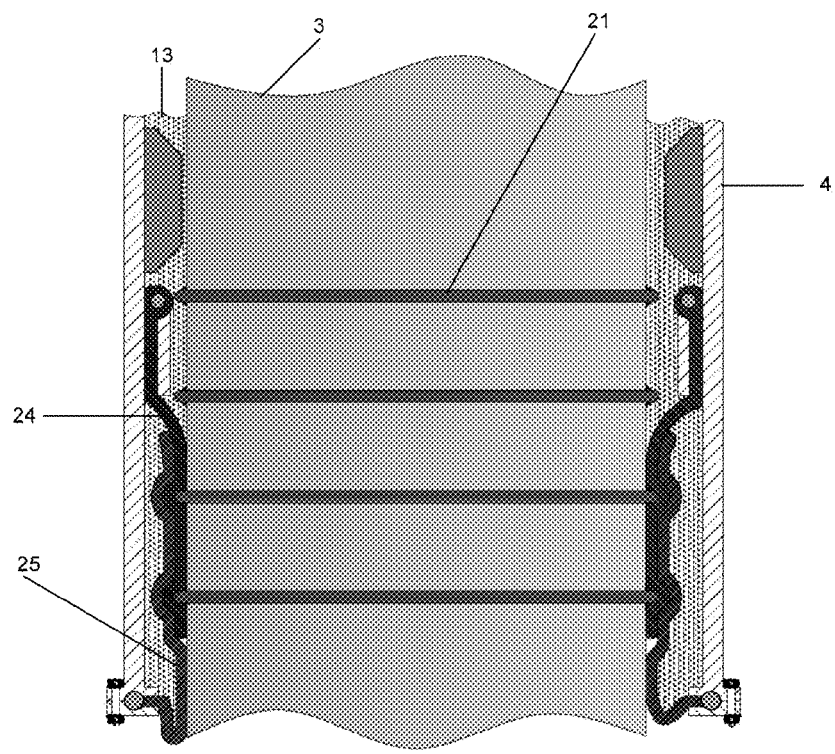
FIG. 8 is an enlarged cross-section view of a grout seal disclosed herein with a driven pile offsetting to one side and a column of grout poured in the annulus between the pile and the pile sleeve in accordance with one embodiment.

Referring to FIG. 8, when a driven pile 3 has a large offset inside a sleeve 4, the basic sealing capacity of the grout seal should have little change. As shown in FIG. 8, the hanging strips 24 should be easy to compensate the pile 3 offsets at the top of the seal. At the bottom of the seal, the side with a narrower annulus should have a more downwardly extended annular resilient tube 25, more than the other side. However, the sealing capacity should maintain the same for the whole seal.

The sealing capacity of the grout seal disclosed herein is independent of the pile 3 offset because of the following three facts: 1) The compression force caused by the annular resilient tube 25 inner diameter is independent of the pile 3 offset; 2) The increased compression force against the outer pile 3 surface due to the wrapping up the shear keys 21 is independent of the pile 3 offset; and 3) The increasing horizontal fluid pressure force against pile 3 outer surface is independent of the narrowness of the annulus and it only depends on the height of the grout 13 column.

In accordance with another embodiment, the grout seal assembly may be installed inside an independent steel-can. The steel-can may then be welded to the bottom of the sleeve 4, or it may be directly installed inside the sleeve inner wall near the bottom.

The connection at the top of each strip 24 to the inner wall of sleeve 4 may be a welded connection or a non-welded connection. In the case of non-welded connections, a part of a bulbous ring section 22 may be added to the top of the strip 24 and a section of a tubular section plate may be utilized combined with some pre-welded fixings to keep the bulbous ring section 22 to the wall.

Welded connections may be also applied to both the top connections and the bottom connections of the seal. In accordance to one embodiment, at the top of each strip 24, a section of the strip may be pre-connected to the outer surface of a doubler plate 28 through a vulcanization process. Welding is then applied at the both sides of the doubler plate 34 to fix the top of each strip 24 to the sleeve inner wall. The same method may be also applied to the bottom section. A part of the seal bottom resilient tube 25 may be pre-connected with an annular doubler 34 surface through a vulcanization process and then the annular doubler 34 may be welded around the sleeve inner wall at the top and the bottom to form a sealed annulus. One advantage of this configuration is to reduce the annulus dimension and the size of the tapered guide shims 16. Another advantage is to place the grout seal directly inside most sleeve 4 designs without attaching an extra can as a traditional inflatable packer does.

Figures 9, 10:
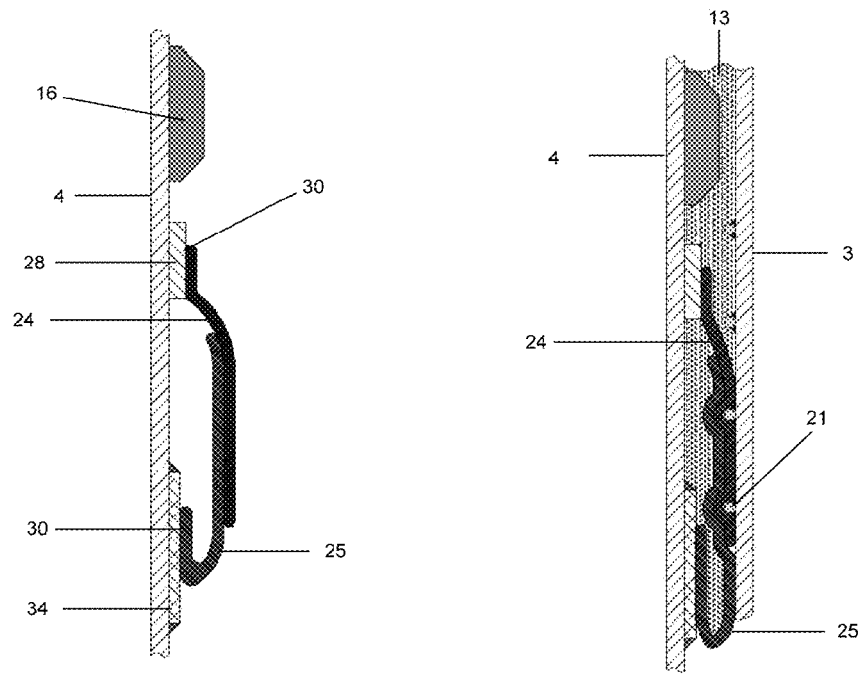
FIG. 9 is an enlarged partial cross-section view of a grout seal disclosed herein with welded connections at the top and an annular welded connection near the sleeve bottom to form a sealing function accordance with one embodiment.
FIG. 10 is an enlarged cross-section view of the grout seal shown in FIG. 9 without a driven pile offsetting to one side and with a column of grout poured in the annulus between the pile and the pile sleeve.

FIG. 9 illustrates an embodiment of the grout seal with welded connections at both the top and the bottom of the seal. A doubler plate 28 for each strip 24 is welded to the inner wall of sleeve 4 at both horizontal sides. A section of each strip 24 top surface is then anchored to a corresponding doubler plate 28 with a bonding surface 30 through a vulcanization process. One section of the bottom annular resilient tube 25 may also be anchored to an annular doubler 34 with a bounding surface 30 through a vulcanization process. The annular doubler 34 is welded at the top and at the bottom to the sleeve 4 inner wall.

Referring now to FIG. 10, the grout seal illustrated in FIG. 9 is activated with a pile 3 driven and without any pile offset. Grout 13 passes through the holes between strips 24 to fill the annulus room below to form a grout 13 column. Some shear keys 21 at the pile 3 outer surface make contacts and wrapped with strips 24 and/or annular resilient tube 25 to enhance the sealing capacity of the seal. Because the density of grout 13 is greater than that of seawater, the fluid pressure of grout 13 at the column bottom is much greater than the surrounding seawater pressure. As a result, the fluid pressure induced by the grout 13 column should provide a horizontal compression force against pile 3 outer surface through the annular resilient tube 25.

Although a preferred embodiment of a grout seal assembly in accordance with the present invention have been described herein, respectively, those skilled in the art will recognized that various substitutions and modifications may be made to the specific features described without departing from the scope and spirit of the invention as recited in the appended claims.

What is claimed is:

1. A passive grout seal assembly, installed on a pile sleeve inner surface near a sleeve bottom to allow a pile inserting from above, for sealing an annulus between a pile outer surface and a sleeve inner surface during an offshore jacket installation, the grout seal assembly comprising:
   a plurality of evenly spaced hanging strips fixed at the sleeve inner wall with holes between the hanging strips to allow fluid passing through, wherein a top end of each hanging strip having anchoring means for fixation to the sleeve inner wall surface and bottom portion of each hanging strip being extended downward, placed in front of an annular resilient tube below; and
   an upper section of the annular resilient tube bonded together with the bottom portion of the plurality of the hanging strips,
   wherein the annular resilient tube comprises a cone section on top of a tubular section, the vertical orientation of the annular resilient tube is kept after a pile inserting, and bottom of the annular resilient tube bottom section has fixed connections to the sleeve inner wall surface to form a sealed annulus between the sleeve inner surface and the tube outer surface.

2. The grout seal assembly according to claim 1, wherein the anchoring means of the hanging strip is a non-welding anchoring means, comprising a part of a bulbous ring added to the top end of the hanging strip, a tubular plate below the bulbous ring and pre-installed fixings at the sleeve inner wall surface.

3. The grout seal assembly according to claim 1, wherein the hanging strips are composed of multiple layers of steel nets bonded together with elastomer materials.

4. The grout seal assembly according to claim 1, wherein the anchoring means of the hanging strip is a welding connection, comprising a doubler which is welded to the sleeve inner wall and a bounding surface between the doubler and the hanging strip surface through a vulcanization process.

5. The grout seal assembly according to claim 1, wherein the cone section and tubular section of the annular resilient tube are both composed of multiple layers of fiber nets bonded together with elastomer materials.

6. The grout seal assembly according to claim 5, wherein the cone section of the upper section of the annular resilient tube has an inner diameter greater than the pile outer diameter, and an inner diameter of the tubular section of the upper section of the annular resilient tube is smaller than the pile outer diameter.

7. The grout seal assembly according to claim 6, wherein the inner diameter of the tubular section of the upper section of the annular resilient tube is at least ½ inch smaller than the pile outer diameter.

8. The grout seal assembly according to claim 5, wherein the tubular section of the annular resilient tube has a height equal to, or greater than one foot.

9. The grout seal assembly according to claim 1, wherein the annular resilient tube bottom section is composed of multiple layers of fiber nets bonded together with elastomer materials.

10. The grout seal assembly according to claim 1, wherein the fixed connection of the tube bottom of the annular resilient tube comprises a flange connection at the bottom of the sleeve.

11. The grout seal assembly according to claim 1, wherein the fixed connection of the tube bottom of the annular resilient tube is a welded connection, comprising a doubler which is welded to the sleeve inner wall and a bounding surface between the doubler and the annular tube surface.

12. The grout seal assembly according to claim 9, wherein the diameter of the annular resilient tube below the tubular section varies with a distance below the tubular section of the annular resilient tube.

13. The grout seal assembly according to claim 1, wherein the bottom of the annular resilient tube is fixed near the sleeve bottom.

14. The grout seal assembly according to claim 1, wherein the whole assembly is installed inside an independent can, the top of which is then fixed to the bottom of the sleeve.

15. A passive grout seal assembly used in an offshore pile installation for sealing an annulus between a pile outer surface and a sleeve inner surface, the assembly comprising:
   an upper section of the assembly comprising a plurality of hanging strips fixed at the sleeve inner wall surface with holes between the strips to allow grout fluid passing through, wherein top of each hanging strip having anchoring means to fix the hanging strip to sleeve inner wall surface;
   a middle section of the assembly, bonded between the plurality of hanging strips extended downward from the upper section of the assembly, comprising a cone section on top of a tubular section; and
   a bottom section of the assembly, an annular resilient tube, extended from the middle section of the assembly above, having a fixed connection at the bottom of the annular resilient tube to the sleeve inner wall to form a sealed annulus between the sleeve inner surface and the tube outer surface for grout sealing, wherein the with the annular resilient tube is composed of the same material as the middle section;

wherein the offshore pile installation, comprising:
  a) each pile is lowered and inserted into a sleeve of a pre-lowered jacket at a seabed;
  b) all inserted piles are driven into sea floor;
  c) an optional jacket leveling operation;
  d) grout fluid is poured into the annulus through the holes at assembly top until a grout column is reached, and;
  e) having an anchoring means between the installed jacket and the seafloor after a grout hardening period.

16. The grout seal assembly according to claim 15, wherein the anchoring means of a hanging strip is a non-welding anchoring means, comprising a part of a bulbous ring added to the top of the hanging strip, a tubular plate below the bulbous ring and pre-installed fixings at the sleeve inner wall surface.

17. The grout seal assembly according to claim 15, wherein the hanging strips are composed of multiple layers of steel nets bonded together with elastomer materials.

18. The grout seal assembly according to claim 15, wherein the fixed connection at the bottom of the annular resilient tube comprises a flange connection at the bottom of a sleeve.

19. The grout seal assembly according to claim 15, wherein the fixed connection at the bottom of the annular resilient tube is a welded connection, comprising a doubler which is welded to the sleeve inner wall and a bounding surface between the doubler and the annular tube surface.

20. The offshore pile installation according to claim 15, wherein the optional jacket leveling operation comprises an upward and/or downward sliding between the pile sleeve and the driven pile inside.

21. The grout seal assembly according to claim 15, wherein both the cone section and the tubular section of the middle section of the assembly are composed of multiple layers of fiber nets bonded together with elastomeric materials.

22. The grout seal assembly according to claim 15, wherein the cone section of the middle section of the assembly has an inner diameter greater than the pile outer diameter, and the inner diameter of the tubular section of the middle section of the assembly is smaller than the pile outer diameter.

23. The grout seal assembly according to claim 22, wherein the inner diameter of the tubular section of the middle section of the assembly is at least ½ inch smaller than the pile outer diameter.

\* \* \* \* \*